(12) United States Patent
Rigali et al.

(10) Patent No.: US 6,847,699 B2
(45) Date of Patent: Jan. 25, 2005

(54) COMPOSITE COMPONENTS FOR USE IN HIGH TEMPERATURE APPLICATIONS

(75) Inventors: Mark J. Rigali, Tucson, AZ (US); Manish P. Sutaria, Philadelphia, PA (US); E. Greg Hilmas, Rolla, MO (US); Anthony C. Mulligan, Tucson, AZ (US); Marlene Platero-AllRunner, Tucson, AZ (US); Mark M. Opeka, Bethseda, MD (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 85 days.

(21) Appl. No.: 10/013,601

(22) Filed: Dec. 4, 2001

(65) Prior Publication Data

US 2002/0154741 A1 Oct. 24, 2002

Related U.S. Application Data

(60) Provisional application No. 60/251,170, filed on Dec. 4, 2000, and provisional application No. 60/251,133, filed on Dec. 4, 2000.

(51) Int. Cl.[7] .............................................. H01J 35/08
(52) U.S. Cl. ...................................................... 378/143
(58) Field of Search ................................. 378/143, 144

(56) References Cited

U.S. PATENT DOCUMENTS

| | | | |
|---|---|---|---|
| 4,772,524 A | 9/1988 | Coblenz | |
| 5,053,092 A | 10/1991 | Lachman | |
| 5,398,193 A | 3/1995 | Deangelis | |
| 5,588,997 A | 12/1996 | Lysson et al. | |
| 5,645,781 A | 7/1997 | Popovic' et al. | |
| 5,679,157 A | 10/1997 | Milliman | |
| 6,063,502 A | 5/2000 | Sue et al. | |
| 6,193,001 B1 | 2/2001 | Eyre et al. | |
| 6,315,065 B1 | 11/2001 | Yong et al. | |
| 6,325,165 B1 | 12/2001 | Eyre | |
| 6,361,873 B1 | 3/2002 | Yong et al. | |
| 6,403,018 B1 * | 6/2002 | Goretta et al. | .............. 264/639 |
| 6,451,442 B1 | 9/2002 | Sue et al. | |
| 2002/0237384 | 9/2002 | Mulligan et al. | |
| 2002/0154741 A1 | 10/2002 | Rigali et al. | |

FOREIGN PATENT DOCUMENTS

WO WO 01/53059 A1 7/2001

OTHER PUBLICATIONS

J. J. Brennan and K. M. Prewo, "High–Strength Silicon Carbide Fibre Reinforced Glass–Matrix Composites," *J. Mater. Sci.*, 15 463–68 (1980).

J. J. Brennan and K. M. Prewo, "Silicon Carbide Fibre Reinforced Glass–Ceramic Matrix Composites Exhibiting High Strength and Toughness," *J. Mater. Sci.*, 17 2371–83 (1982).

P. J. Lamicq, et al., "SiC/SiC Composite Ceramics," *Am. Ceram. Soc. Bull.*, 65[2] 336–38 (1986).

T. I. Mah, et al., "Recent Developments in Fiber–Reinforced High Temperature Ceramic Composites," *Am. Ceram. Soc. Bull.*, 66 [2] 304–08 (1987).

K. M. Prewo, "Fiber–Reinforced Ceramics: New Opportunities for Composite Materials," *Am. Ceram. Soc. Bull.*, 68[2] 395–400 (1989).

(List continued on next page.)

Primary Examiner—Craig E. Church
(74) Attorney, Agent, or Firm—Banner & Witcoff, Ltd.

(57) ABSTRACT

Fibrous monolith composites suitable for use in high temperature environments and/or harsh chemical environments are provided, along with methods of preparation thereof. The fibrous monolith composites exhibit such beneficial properties as enhanced strength, corrosion resistance, thermal shock resistance and thermal cycling tolerance.

26 Claims, 4 Drawing Sheets

OTHER PUBLICATIONS

H. Kodama, et al., "Silicon Carbide Monofilament–Reinforced Silicon Nitride or Silicon Carbide Matrix Composites," *J. Am. Ceram. Soc.*, 72 [4] 551–58 (1989).

J. R. Strife, et al., "Status of Continuous Fiber–Reinforced Ceramic Matrix Composite Processing Technology," *Ceram. Eng. Sci. Proc.*, 11[7–8] 871–919 (1990).

D. Kovar, et al., "Fibrous Monolithic Ceramics" *J. Am. Ceram. Soc.*, 80, [10] 2471–2487 (1997).

G. Hilmas, et al., "Fibrous Monoliths: Non–Brittle Fracture from Powder–Processed Ceramics," *Mat. Sci. & Eng. A.*, 195, 263–268 (1995).

G.E. Hilmas, et al., "SiC and $Si_3N_4$ Fibrous Monoliths: Non–Brittle Fracture From Powder Processed Ceramics Produced by Coextrusion," vol. 51 *Ceramic Processing Science and Technology*, pp. 609–614 (1993).

* cited by examiner

COMPOSITE COMPONENTS FOR USE IN HIGH TEMPERATURE APPLICATIONS

CROSS-REFERENCE TO RELATED APPLICATIONS

This application is based on, and claims the benefit of, co-pending U.S. Provisional Application Serial No. 60/251,170, filed on Dec. 4, 2000, and entitled "High Performance Fibrous Monolith X-Ray Target," and co-pending U.S. Provisional Application Serial No. 60/251,133, filed on Dec. 4, 2000, and entitled "High Temperature Carbide, Oxide, Nitride, Silicide, And Boride Based Fibrous Monoliths For High Temperature Application."

The present invention was made with U.S. Government support under grant Number DASG60-00-C-0069 awarded by the Ballistic Missile Defense Organization, grant Number NAS8-40553 awarded by the National Aeronautics and Space Administration, grant Number NAS8-97002 awarded by the National Aeronautics and Space Administration, and grant Number N00014-00-C-0387 awarded by the Office of Naval Research. Accordingly, the Government may have certain rights in the invention described herein.

FIELD OF THE INVENTION

The present invention relates to multi-component composites, such as fibrous monolith ceramic composites, suitable for use in materials and structures that are subject to harsh environmental conditions, including extreme temperatures, chemical atmospheres and thermal shock, and methods of preparing the same. The high temperature FM composites have increased thermal shock resistance and increased thermal cycling tolerance.

BACKGROUND OF THE INVENTION

Certain carbides, nitrides, borides, oxides, phosphates and suicides exhibit enhanced mechanical properties, including enhanced strength, oxidation resistance, damage tolerance and wear resistance. As a result, these materials have found use in high temperature applications where the materials are subject to extreme temperatures (greater than 3000° C.), as well as corrosive environments. For example, many of the carbides, nitrides, borides, oxides, phosphates and suicides of the elements from Groups IVb, Vb, and VIb of the periodic table, as well as carbides, nitrides, borides, oxides, and silicides of boron, aluminum, and silicon have been used in industrial and other applications where such conditions are likely to be encountered. Generally, structures formed of these materials exhibit improved strength and hardness at ambient and elevated temperatures, improved toughness and wear resistance, high melting points, thermal shock resistance, and oxidation resistance.

Historically, $ZrB_2$ and $HfB_2$ based materials have been the choice for high-temperature ablation resistance in oxidizing environments. They have high melting points (about 3000° C.), excellent oxidation resistance, elevated temperature creep resistance, and moderate resistance to thermal shock. The addition of SiC boosts their resistance to oxidation at intermediate temperatures to produce the best performing diboride material. Above 2200° C. it is the high melting point carbides of Zr, Ta, and Hf (3540° C., 3880° C., and 3890° C., respectively) and not the diborides that exhibit the best oxidation resistance. TaC—HfC solid solutions (e.g. 80% TaC–20% HfC) have high melting temperatures and even better oxidation resistance than the individual Hf and Ta carbides. However, the use of these monolithic materials has been limited due to their poor resistance to thermal shock.

As a more specific application, materials capable of withstanding high temperatures are desired for use in X-ray system design, particularly for the X-ray target. The maximum X-ray power output from an X-ray tube is an important parameter in the operation and maintenance of a radiological system. The time period required to inspect an object is inversely proportional to the X-ray power output. For a given X-ray power output of the X-ray tube, the tube lifetime is directly proportional to its maximum power rating. Accordingly, higher values for the maximum X-ray power output are desirable to reduce the inspection times and the throughput of patients or objects examined with the radiological system, as well as to reduce the maintenance and operating costs as a result, in part, of the longer tube lifetimes. Because of the inefficiencies related to X-ray sources, storage and movement of waste heat from the radiation source is an important consideration in the design of X-ray systems. The thermal expansion match between the substrate and the target material and the ability of the target material to contribute to the high voltage stability are important material characteristics to be considered when designing an X-ray target.

Target materials for X-rays have been made of Cu or similar materials and cooled with circulating oil or water. Other targets utilize standard carbon backed metal targets, which provide improved performance compared to Cu-based targets by eliminating the required cooling but have the disadvantage of an inability of the braze composition to withstand the temperature profiles that are experienced during operation. Where Cu or similar targets with low melting temperatures are used, active target cooling is required to withstand the high temperature during operation, thereby increasing the complexity.

There remains a need for materials exhibiting improved strength, hardness, thermal shock resistance, oxidation resistance and fracture toughness, as compared to presently known materials, for use in high temperature applications and/or harsh chemical environments.

SUMMARY OF THE INVENTION

The present invention relates to structures that utilize fibrous monolith ("FM") composites to provide the structures with excellent thermal shock resistance, excellent erosion and oxidation/corrosion resistance, enhanced thermal cycling tolerance, enhanced strength at elevated temperatures, and graceful, non-catastrophic failure at room and elevated temperatures. The present invention also relates to methods of preparing such composites and structures.

The composites of the present invention may be used as coatings or external surface component materials in combination with existing structures or with particular substrate structures to impart the benefits of the composites to the structures. Additionally, a more substantial portion of, or even a complete, structure may be formed from the FM composites.

Applications for the fibrous monolith composite materials of the present invention include use in structures such as flat plates, solid hot gas containment tubes, radiant burner tubes, radiant burner panels, rocket nozzles, body armor panels, X-ray targets for CT scanner X-ray tubes, high temperature furnace equipment, antimatter containment vessels, furnace furniture, solar-thermal-propulsion components, internal combustion engine components, turbine engine, turbomachinery components and steering vanes for vectored thrust control, which can all be readily formed from the green material.

DETAILED DESCRIPTION OF THE INVENTION

The present invention is directed to the application of FM composites in high temperature and/or harsh chemical environments and to methods of preparing FM composites and structures for use in such environments. The FM composites exhibit mechanical properties including excellent thermal shock resistance, excellent erosion and oxidation/corrosion resistance, enhanced thermal cycling tolerance, enhanced strength at elevated temperatures, and graceful, non-catastrophic failure at room and elevated temperatures. More particularly, the structures of the present invention include fibrous monolithic ceramic and/or metallic composites that include a plurality of filaments having a core surrounded by a shell. The composites may be formed into structures and/or provided as a coating for or layered onto a surface of structures subject to high temperature and/or harsh environments to impart the desired characteristics to the structure.

As used herein, "fibrous monolithic composite" and "fibrous monolith" are intended to mean a ceramic and/or metallic composite material that includes a plurality of monolithic fibers, or filaments, each having at least a cell phase surrounded by a boundary phase but may include more than one core and/or shell phase. Fibrous monoliths exhibit the characteristic of non-brittle fracture, such that they provide for non-catastrophic failure.

As used herein, "cell phase" is intended to mean a centrally located primary material of the monolithic fiber, that is dense, relatively hard and/or strong. The cell phase extends axially through the length of the fiber, and, when the fiber is viewed in transverse cross-section, the cell phase forms the core of the fiber. The "cell phase" also may be referred to as a "cell" or "core".

As used herein, "boundary phase" is intended to mean a more ductile and/or weaker material that surrounds the cell phase of a monolithic fiber in a relatively thin layer and that is disposed between the various individual cell phases, forming a separating layer between the cell phase and surrounding cell phases when a plurality of fibers are formed in a fibrous monolithic composite. The "boundary phase" also may be referred to as a "shell," "cell boundary" or "boundary".

Fibrous monoliths ("FMs") are a unique class of structural ceramics that have mechanical properties similar to continuous fiber reinforced ceramic composites (CFCCs). Such properties include relatively high fracture energies, damage tolerance, and graceful failures. In contrast to CFCCs, FMs can be produced at a significantly lower cost. FMs, which are monolithic ceramics, generally are manufactured by powder processing techniques using inexpensive raw materials. As a result of the high performance characteristics of FMs and the low costs associated with manufacture of FMs, FMs are used in a wider range of applications than heretofore typical for ceramic composites.

Figure 1:
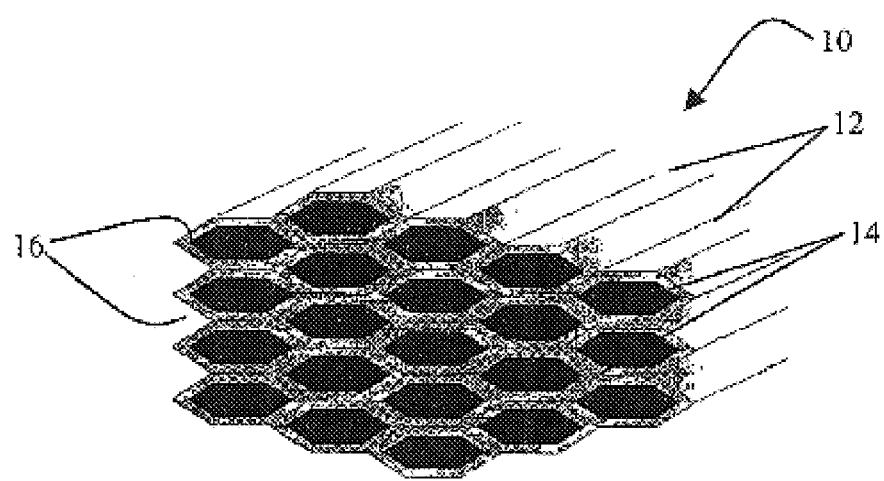
FIG. 1 is a perspective cross-sectional view of a uniaxial fibrous monolith composite in accordance with the present invention.

As shown in FIG. 1, the macroarchitecture of an FM composite 10 generally includes multiple filaments 12 each comprising at least two distinct materials—a primary phase in the form of elongated polycrystalline cells 14 separated by a thin secondary phase in the form of cell boundaries 16. Typical volume fractions of the two phases are between about 50 to about 99% of the fiber for the primary phase (polycrystalline cell) and between about 1 to about 50% of the fiber for the interpenetrating phase (cell boundary). Preferably, the volume fractions are between about 80 to about 95% for the primary phase (polycrystalline cell) and between about 5 to about 20% for the interpenetrating phase (cell boundary). The primary or cell phase typically consists of a structural material of a metal, metal alloy, carbide, nitride, boride, oxide, phosphate or silicide and combination thereof. The cells are individually surrounded and separated by cell boundaries of a tailored secondary phase. Powders that may be used in the secondary phase include compounds to create weak interfaces such as fluoromica, and lanthanum phosphate; compounds to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, tungsten, aluminum, niobium, silver, rhenium, chromium, or their alloys.

Advantageously, powders which may be used in the cell and/or boundary phase composition to provide the green matrix filament include diamond, graphite, ceramic oxides, ceramic carbides, ceramic nitrides, ceramic borides, ceramic suicides, metals, and intermetallics. Preferred powders for use in that composition include aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Compositions comprising the cell phase differ from those comprising the boundary phase in order to provide the benefits generally associated with FMs. For example, the compositions may include formulations of different compounds (e.g., HfC for the cell phase and WRe for the boundary phase or WC—Co and W—Ni—Fe) or formulations of the same compounds but in different amounts (e.g., WC-3% Co for the cell phase and WC-6% Co for the boundary phase) as long as the overall properties of the compositions are not the same. For example, the compositions can be selected so that no excessively strong bonding occurs between the two phases in order to limit crack deflection. Examples of FM composites include but are not limited to: HfC/graphite, HfC/Wre, ZrC/BN, TaC(20% HfC)/BN, HfC/Re—Ir, ZrC/Re, WC/W, WC—Co/Nb, NbC/Nb, VC/Mo, TiC/W, HfN/graphite, HfB$_2$/BN, ZrB$_2$/BN, HfC/HfO$_2$, HfC/HfN$_{0.33}$, HfC/HfC$_{0.67}$.

Figure 2:
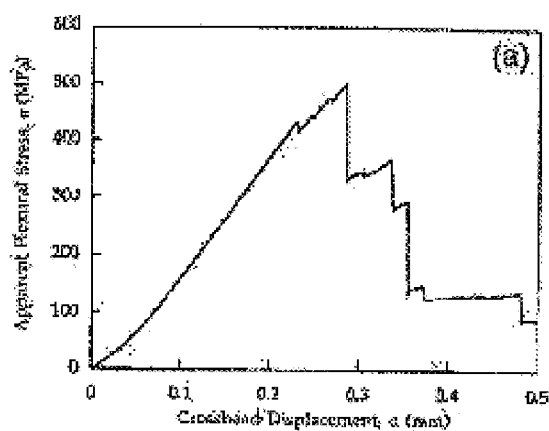
FIG. 2 is a graphical illustration of flexural stress as a function of displacement for a fibrous monolith composite in accordance with the present invention.

The cell boundary phase may be selected to create pressure zones, microcrack zones, ductile-phase zones, or weak debond-type interfaces in order to increase the toughness of the composite. For example, low-shear-strength materials such as graphite and hexagonal boron nitride make excellent weak debond-type cell boundaries and are present in Si$_3$N$_4$/BN and SiC/Graphite FM composites. The weak BN and graphite interfaces deflect cracks and delaminate thereby preventing brittle failure of these composites and increasing their fracture toughness. As a result, FM structures exhibit fracture behavior similar to CFCCs, such as C/C and SiC/SiC composites, including the ability to fail in a non-catastrophic manner. By way of example, typical flexural stress as a function of displacement for a Si$_3$Ni$_4$/BN FM material is shown in FIG. 2, which illustrates that fibrous monolith composites are non-brittle and retain significant load bearing capability after fracturing is initiated.

Composites of the present invention include multifilament FM layers and FM substrates with unique fiber orientations. These composites may be used to fabricate various structures, may be applied as coatings on the desired structures, or may be provided as a structural layer to provide thermal shock resistance. Use of the composites also may increase the erosion/oxidation resistance lifetime of structures used in harsh chemical environments.

The composite materials of the present invention are capable of tolerating operating temperatures approaching 5400° F. (3000° C.), while maintaining excellent thermal, physical, and mechanical properties. In addition, these materials satisfy material requirements such as low density, high elastic modulus, low coefficient of thermal expansion, high thermal conductivity, excellent erosion and oxidation/corrosion resistance, and flaw-insensitivity. They also possess the ability to be joined, to survive thermal cycling and multi-axial stress states, and for reusable applications, the materials maintain the above attributes after prolonged exposures to harsh chemical environments.

Low shear strength cell boundaries, such as BN and graphite, accommodate the expansions and contractions that occur during thermal cycling of the FM composite components, thereby resulting in improved thermal shock resistance. From the mechanical behavior viewpoint, such cell boundaries enable non-catastrophic failure due to stress delocalization and crack deflection mechanisms at both room and elevated temperatures. In addition, the presence of a ductile or relatively ductile cell boundary phase increases the damage tolerance and wear resistance of the FM composite. Without intending to be limited by any theories, it is believed that the improvement in damage tolerance of the present composites is attributed to the FM architecture in which the cell boundary absorbs and deflects crack energy during impact so that damage, when it occurs, is isolated to the individual micron-sized cells.

Figure 3:
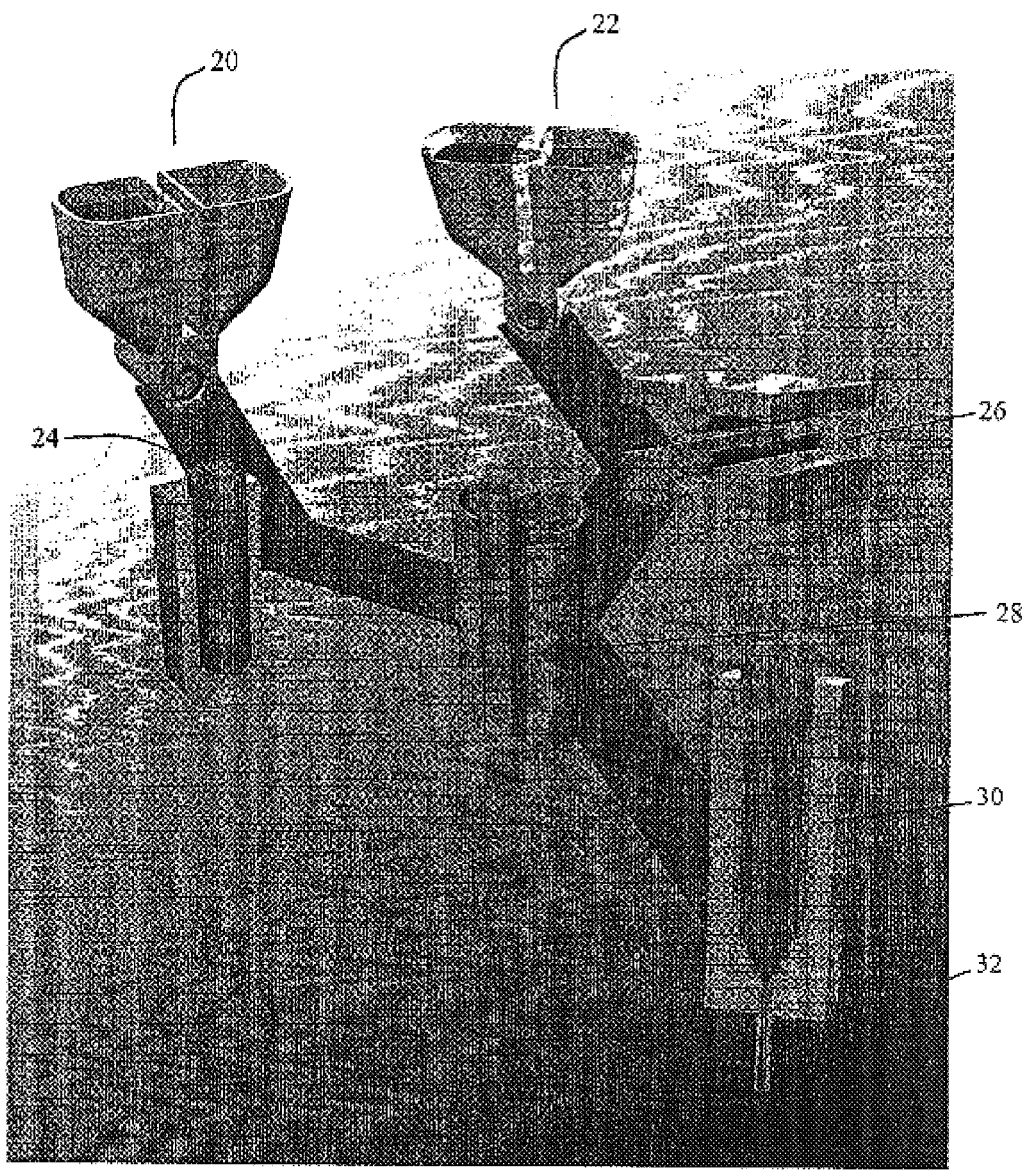
FIG. 3 is a schematic flow diagram showing a process of preparing filaments in accordance with the present invention.
Figure 4:
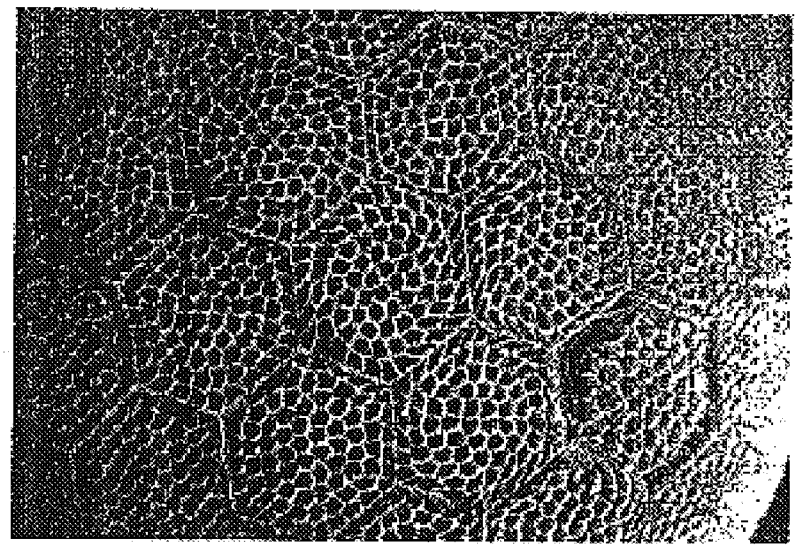
FIG. 4 is a photomicrograph of an axial cross-section of an FM composite in accordance with the present invention.

Various methods of preparing fibrous monolithic filaments are known in the art, including the methods disclosed in U.S. Pat. No. 5,645,781, which is incorporated by reference herein in its entirety. Generally, as illustrated in FIG. 3, the process of preparing fibrous monolithic filaments in accordance with the present invention includes separately blending the starting materials for a core 20 and shell 22, forming the core 24 having a first composition and forming the shell 26 having a second composition, forming the feed rod 28 from the core and shell, and extruding the feed rod 30 one or more times to provide a ceramic filament 32. The filaments may then be formed and/or arranged to provide the desired structure in accordance with the present invention.

Fibrous monolith composites are fabricated using commercially available ceramic and metal powders using a process for converting ordinary ceramic powder into a "green" fiber that include the powder, a thermoplastic polymer binder and other processing aids. The fiber is compacted into the "green" state to create the fabric of elongated polycrystalline cells that resemble a fiber after sintering or hot pressing. The process is widely applicable, and allows a cell/cell boundary bi-component fiber to be made from a thermodynamically compatible set of materials available as sinterable powders. The scale of the microstructure is determined by the green fiber diameter (cell size) and coating thickness (cell boundary). Once the green composite fiber is fabricated it can be formed using any method known to those skilled in the art into the shape of the desired component having, for example, conventional composite architecture (e.g., uniaxial lay-up, biaxial lay-up, woven fabric, etc.). The thermoplastic binder is removed in a binder burnout step, and the component is hot pressed or sintered to obtain a fully consolidated and densified component.

The core and shell of the feed rod are formed of mechanically activated and agglomerate-free powders. The powders, such as the metals, alloys, carbides, nitrides, borides, oxides, phosphates and silicides listed above, are selected to provide the desired mechanical properties in the final composite. A wide variety of combinations of powders may be used for the core and shell materials. Powders having particle size distributions in the range of about 0.01 to about 100 microns ($\mu$m) in size may be used. Preferably, the particle size of the powder is between about 1 to about 10 microns.

Milling stations such as commercially available from Boston Gear, Boston, Mass. may be used as needed to ball mill the ceramic powder to obtain the desired size distribution. The desired ceramic powder preferably is ball milled with ethanol. The ceramic/ethanol blend is ball milled with milling media such as silicon nitride (Si$_3$N$_4$) or zirconium oxide (ZrO$_2$) thus creating a ball-mill slurry. Sintering aids such as, for example, aluminum oxide (Al$_2$O$_3$) and yttrium oxide (Y$_2$O$_3$) additions to Si$_3$N$_4$, when necessary, are added and milled together with the ball mill slurry. The powders are milled for a time effective for providing desired particle sizes and distribution. Typical milling times are between about 24 to about 120 hours, depending on the starting ceramic material. For example, boron nitride (BN) powder is milled for about 12 to 24 hours, silicon nitride powder is milled for about 24 hours, and zirconium carbide (ZrC), purchased as a fairly coarse refractory ceramic, is typically milled for a longer period, about 72 to 120 hours.

Upon completion of the milling operation, the ball mill slurry is collected from the milling station and the ceramic/ethanol mixture is separated from the milling media using a perforated mill jar lid as a "strainer". The ethanol is separated from the ceramic powder using a Buchi Rotavapor separator commercially available from Brinkman Instruments Inc. of Westbury, N.Y. Solvent is evaporated from the ball-milled slurry in the Buchi Rotavapor separator and the ceramic powder dried. Ethanol solvent may be reclaimed as desired for reuse or proper disposal according to local, state, and federal waste disposal requirements. The ceramic powders are removed from the separator jar and placed in labeled plastic jars.

The individual ceramic powders are blended with thermoplastic melt-spinnable polymer binders, as well as one or more processing aids such as plasticizers as necessary, using a high shear mixer commercially available from C. W. Brabender of South Hackensack, N.J. or from Thermo Haake of Paramus, N.J., to form a smooth, uniformly suspended composite blend also referred to as a "dope". Examples of thermoplastic binders include ethylene ethylacetate (EEA) commercially available as DPDA-618NT from Union Carbide, ethylene vinylacetate (EVA) commercially available as ELVAX470 from E.I. DuPont Co., and Acryloid Copolymer Resin (B-67) commercially available from Rohm and Haas, Philadelphia, Pa. Examples of plasticizers include heavy mineral oil (HMO) commercially available as Mineral Oil White, Heavy, Labguard® and methoxy polyethyleneglycol having a molecular weight of about 550 (MPEG-550) commercially available from Union Carbide. The composite blend is compounded at about 150° C. while metering a viscosity-modifying additive until a viscosity is obtained that will ensure desired rheology for a molten fiber extrusion process.

Because the mixers have fixed volume reservoirs, the recipes for the thermoplastic/ceramic blends produced in batches are formulated on a volumetric, as opposed to a gravemetric basis. As an example, one blend consists of between about 50 to about 62 vol. % of the ceramic powder, between about 37 to about 50 vol. % of the thermoplastics, and between about 0 to about 12 vol. % of the plasticizers. Thus, the mass of a batch of ceramic/thermoplastic dope varies with the density of the ceramic powder. By way of example, a batch of $Si_3N_4$ with a density of 3.44 g/cc produces approximately 1 kg of "green" compound material.

After mixing, the composite blends are warm-pressed into a green composite feed rod. A composite feed rod consists of a "core" of a primary ceramic material enclosed by a cladding or "shell" of a second ceramic material. A preferred feed rod pressing station includes a hydraulic vertical press with one or more heated cylindrical dies, which allows the cores to be pressed. A heated uniaxial platen press, such as commercially available from Carver Inc., of Wabash, Ind., is used to press the shells for the composite feed rods. The volume ratio of the core and shell of a composite feed rod can be systematically varied to any desired ratio by using different sets of machine tooled core and shell dies. By way of example, "green" composite feed rods (22 mm in diameter) with the following core/shell volume ratios are commonly produced: 90/10, 82.5/17.5, 69/31, and 50/50.

A pressed feed rod is extruded. One extrusion process includes a computer numerically controlled (CNC) ball-screw extruder, including a ball screw from Thomson Saginaw of Saginaw, Mich., connected to a CNC directed current (DC) servomotor from Compumotor, Rohnert Park, Calif. The ball screw is connected to a brass metal rod that is used to pressurize and extrude the contents of the heated cylindrical die. The entire assembly is mounted and held vertically in a metal framework. Composite feed rods are extruded through a spinneret to produce a green fiber filament or "spaghetti". This process also is referred to as "single filament co-extrusion" (SFCX).

Typical filament sizes are 100 $\mu$m, 250 $\mu$m, 320 $\mu$m, 500 $\mu$m, 750 $\mu$m, 1 mm, 2 mm or 4 mm in diameter. Filaments having diameters between about 0.01 and about 10 mm may be extruded using a spinneret fabricated with the appropriate orifice diameter. The extruded filaments maintain the volume ratio of the original feed rod despite significant differences in diameters, such as a starting feed rod diameter of 22 mm and an extruded filament diameter of 250 $\mu$m (which is approximately 100 times smaller than the starting feed rod diameter). Use of thermoplastic/ceramic blends having appropriate rheological properties for the cores and shells maintain the volume ratio of the original feed rod. Preferably, the viscosity of the core material is approximately equivalent to the viscosity of the shell material. Use of core and shell materials with approximately equivalent viscosities provides improved flow stability and control to assist with maintaining the original geometry of the feed rod.

In general, filaments having diameters of no more than about 250 $\mu$m can be obtained by single filament co-extrusion. Smaller diameter green filaments may be readily broken during the winding and extrusion process, thereby limiting the ability to produce filaments having smaller diameters. To obtain cell sizes smaller than 250 $\mu$m, filaments having diameters of between about 1 to about 2 mm may be extruded and bundled together to form a multifilament feed rod having a diameter of about 22 mm. This feed rod is then extruded through a spinneret to produce multifilament spaghetti. Using this multifilament co-extrusion (MFCX) procedure, cell sizes approaching 10 microns or less can be produced.

Filaments having more than one cell composition and/or more than one shell composition can also be prepared to provide the benefits of the properties of the additional composition and/or to insulate the shell material. As an example, a layer of a second cell composition may be disposed around the shell, such that the filament includes a central cell, an intermediate shell and an outer shell. Other combinations of cells and shells also may be prepared as desired. For example, a core material in combination with a plurality of different shells may be used.

Figure 7:
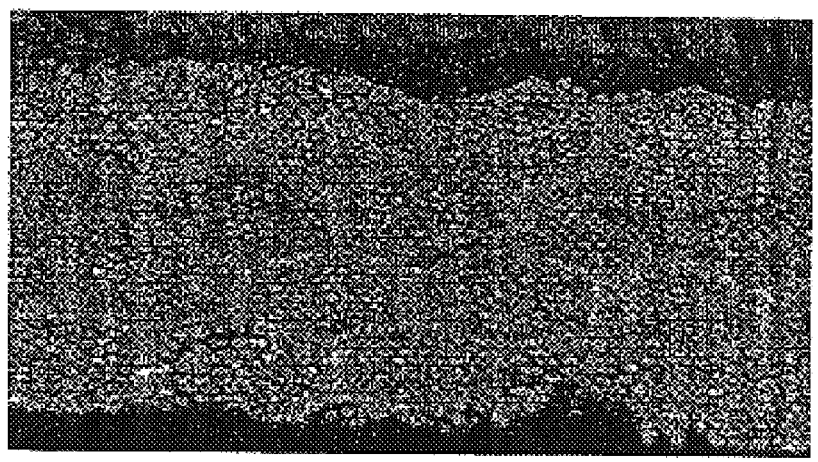
FIG. 7 is a photomicrograph of an axial cross-section of a second FM composite in accordance with the present invention.

A plurality of filaments may be bundled together and disposed within another shell. This arrangement of filaments results in essentially a "honeycomb" configuration when arranged to form the FM composite, as shown in FIG. 7. In this architecture, a plurality of filaments each having a core and shell are bundled together and coated in a second shell. This architecture can be obtained using a modified co-extrusion process where an individual filament is formed in a first pass through the extruder. A plurality of fibers of a predetermined length are bundled, encased in a second, common shell and again passed through the extruder. As an example, the volume ratios of the individual filament in the first pass is 82.5% for the core and 17.5% for the shell, and the bundled fibers are coated with a 17.5% volume common shell. The bundled arrangement maintains the mechanical behavior of the filaments but insulates a "weaker" shell material from the external environment and any harsh conditions.

Numerous modifications and adjustments to the process for preparing filaments may be made to allow for variations in the particular compositions used to prepare the filaments.

For example, viscosities may be adjusted, the diameter of the extrusion die may be changed, or the relative volumes of the core and shell may be changed. Other methods for extruding and/or otherwise forming the filaments known to those of skill in the art also may be utilized. For example, any modified process for continuous co-extrusion may be used.

Generally, filaments may be bundled, woven, wound, braided, chopped, pressed, or laid up to produce essentially a near net shape pre-form. In a typical two-dimensional (2D) lay-up, the composite filament is wound on a computer numerically controlled (CNC) drum winder. The winder includes a rotating plastic drum driven by a servomotor from Compumotor, Rohnert Park, Calif. A single axis motion controller from Compumotor, Rohnert Park, Calif. is used to adjust the filament position as the filament is wound around the drum. Two-dimensional parts having a desired fiber alignment can be fabricated using the CNC drum winder.

After winding, composite filament sheets are cut to the desired shape and dimensions. The cut sheets can then be laid up in any standard 2D architecture (i.e. uniaxial, 0°/90°, quasi-isotropic, etc.). After the 2D pre-form is laid-up, a uniaxial platen press is used to warm laminate the component part. 3D components such as rocket nozzles, rocket throats, combustor liners and the like can be built using helical, axial and circumferential lay ups and windings and using any combination thereof.

In another embodiment of the present invention, the green filaments are grouped or bundled into a cylinder or other predetermined shape. The bundled filaments are cut to a predetermined length and machined, molded or otherwise formed to provide a structure having a desired shape and having the FM filaments extending generally parallel to the axis of the structure. One or more FM layers may be disposed across a surface of the structure as desired to provide increased enhancement of the mechanical properties of the structure. The FM composite structure is warm laminated to consolidate the FM filaments.

In other embodiments, articles having various filament characteristics and orientations may be provided. For example, in preparing an FM layer, different combinations of cell and/or boundary materials, filament size, filament shape, and filament orientation are contemplated as being within the scope of the invention. Such variations in these variables can be applied on a layer-to-layer basis, that is, a first layer is formed of filaments of uniform composition, size, shape and orientation and a second layer is formed with filaments having a composition, size, shape and/or orientation different from that of the first layer. Such variations also can be applied within a particular layer, that is, the layer is formed of filaments of differing compositions, sizes, shapes, and/or orientations. Any number and combination of layers may be used in forming the FM composite article in order to achieve the benefits of desired properties of the FM materials.

In another embodiment, the FM structure can be produced using rapid prototyping techniques as known to those skilled in the art or any modified rapid prototyping technique. For example, the feed rod can be loaded into a freeform fabrication apparatus having a heated barrel. A molten material is formed and directly feeds into a fine deposition nozzle having a volumetric flow rate that can be adjusted for high raw material throughput dispensing. The molten material is extruded through a high pressure nozzle onto a foam pad. The foam pad is mounted on a 4-axis, motorized, computer numerically controlled (CNC) platen. The solid freeform fabrication technique provides a complex part from one single, continuous fiber.

Although the invention is described with reference to generally cylindrical-shaped FM filaments that are bundled together to form FM composites wherein the shape of the filaments become essentially hexagonal in cross-section as a result of processing, other configurations are contemplated, as will be appreciated by those skilled in the art. For example, filaments having square, rectangular or triangular cross-sections may be obtained by varying the shape of the extrusion die accordingly. Additionally, the shape of the die used in the laminating step also may be modified accordingly as desired. Thus, different shapes and configurations of filaments in the FM composite may be obtained, which can impact the resultant mechanical properties of the FM composite.

A binder burnout furnace, such as commercially available from Lindberg, Watertown, Wis. is used to remove polymer binder from the formed composite coatings and FM composite structures. Sintering processes, including hot pressing, hot isostatic pressing or pressureless sintering, provide final consolidation and densification of the composite coatings and FM composite structures. A typical induction hot-press such as commercially available from Vacuum Industries, Somerville, Mass. is capable of a maximum temperature of 2400° C. and a maximum load of 100 tons and can be operated in several different environments including vacuum, argon, and nitrogen atmospheres.

In another embodiment of the present invention, FM composites are used in high performance X-ray targets for X-ray vacuum tubes X-rays used in the medical, defense, industrial, and security industries. FM composites in accordance with the present invention provide target designs that are capable of withstanding high power and high temperature and that have a relatively high heat capacity. The high conductivity FM composite materials spread the heat through the target, which lowers the maximum temperature at the "spot" and increases the useful time for the target. The target spins at speeds up to 10,000 rpm while undergoing local surface heating to temperatures in excess of 1600° C. FM composites are able to withstand the thermal shock and cyclic thermal fatigue for typical operation inside the X-ray tube.

Figure 6:
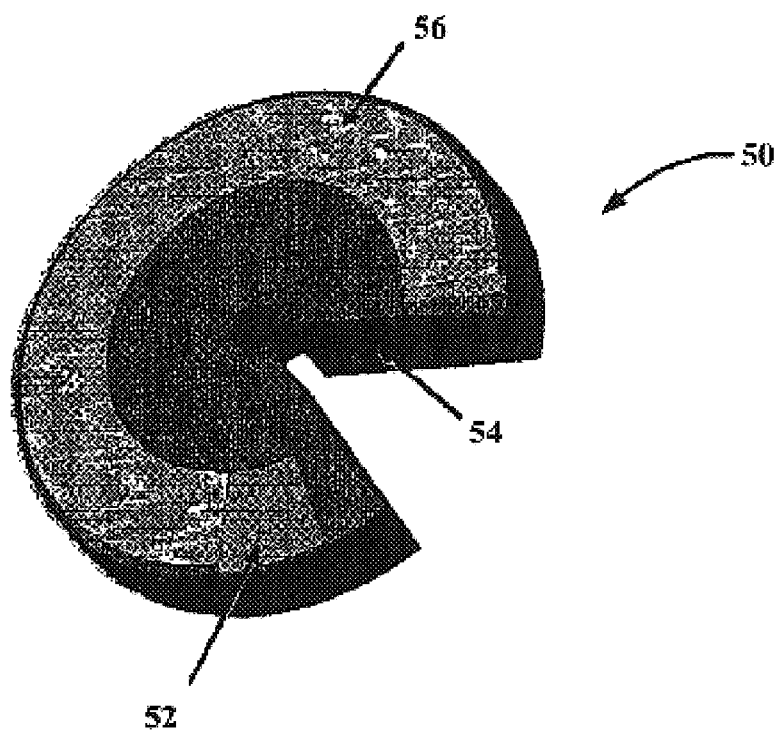
FIG. 6 is a schematic illustration of an X-ray target including a FM composite in accordance with the present invention.

As shown in FIG. 6, an X-ray target 50 generally is disc-shaped. An annular layer of FM composite material 52 is disposed adjacent the outer perimeter at or near an upper surface of the target substrate 54. A monolithic layer 56 may be disposed over the FM composite material 52. Preferably the layer of FM composite material 52 is relatively thin (less than about 1 mm).

Direct bonding of a FM composite material onto a substrate material such as graphite is possible with the composites of the present invention, thereby eliminating intermediate layers (such as titanium-zirconium-molybdenum alloy, or "TZM") which are typically required in conventional systems as an interface between the target surface material and the substrate to compensate for thermal expansion differences between the two. The need for high temperature brazing to attach the intermediate layer to the substrate is eliminated. Consequently, the temperature capability of the target material is improved considerably. Furthermore, elimination of the intermediate layer results in a target of reduced weight, thereby leading to less wear on X-ray target components and longer life of the X-ray tube.

Coefficient of thermal expansion (CTE) analysis may be used to assist with determining the feasibility of a system as a coating material. CTE mismatch leads to the buildup of inherent stress as materials react to temperature change and also may lead to catastrophic failure. CTE of a composite can be manipulated based on the volume fraction of the core and shell compositions. Thermal stresses developed in coating result at least in part to differences in CTE between the substrate and coating. Most coatings will not inherently fail if the CTE mismatch does not exceed about +/−10%.

Rapid prototyping techniques such as extrusion freeform fabrication (EFF) deposits the HfC/W—Re fibrous monolith materials on graphite substrates. A retrofitted high pressure extruder head used with a fused deposition modeler provides for rapid prototyping of the FM material. The EFF process entails pressing a feedrod of the compounded engineering thermoplastic raw material. The feedrod is loaded into a heated barrel on the EFF apparatus. The molten FM material directly feeds into a fine deposition nozzle whose volumetric flow rate can be adjusted for high raw material throughput dispensing. The molten FM material is subsequently extruded through the nozzle onto a CAD computer interfaced, movable X-Y-Z platen located directly below the deposition head. The computer controlled EFF apparatus lays the FM material as spirals or in the radial directions.

In other embodiments, alternative methods of preparing FM filaments and composite materials may be utilized. Alternative compositions and methods, including those described in the co-pending U.S. patent applications listed in Table 1, which are incorporated by reference herein in their entireties, are contemplated for use with the present invention.

TABLE 1

| TITLE | INVENTORS | FILING DATE | ATTY DOCKET NO. |
|---|---|---|---|
| ALIGNED COMPOSITE STRUCTURES FOR MITIGATION OF IMPACT DAMAGE AND RESISTANCE TO WEAR IN DYNAMIC ENVIRONMENTS | Anthony C. Mulligan Mark J. Rigali Manish P. Sutaria Dragan Popovich | Dec. 4, 2001 | 03248.00038 |
| CONSOLIDATION AND DENSIFICATION METHODS FOR FIBROUS MONOLITH PROCESSING | Manish P. Sutaria Mark J. Rigali Ronald A. Cipriani Gregory J. Artz Anthony C. Mulligan | Dec. 4, 2001 | 03248.00039 |
| METHODS AND APPARATUS FOR PREPARATION OF THREE-DIMENSIONAL BODIES | Anthony C. Mulligan Mark J. Rigali Manish P. Sutaria Gregory J. Artz Felix H. Gafner K. Ranji Vaidayanathan | Dec. 4, 2001 | 03248.00040 |
| COMPOSITIONS AND METHODS FOR PREPARING MULTIPLE-COMPONENT COMPOSITE MATERIALS | Mark J. Rigali Manish P. Sutaria Felix Gafner Ron Cipriani Randy Egner Randy C. Cook | Dec. 4, 2001 | 03248.00044 |
| MULTI-FUNCTIONAL COMPOSITE STRUCTURES | Anthony C. Mulligan John Halloran Dragan Popovich Mark J. Rigali Manish P. Sutaria K. Ranji Vaidyanathan Michael L. Fulcher Kenneth L. Knittel | Dec. 4, 2001 | 03248.00045 |

EXAMPLES

The following examples are intended to illustrate the present invention and should not be construed as in any way limiting or restricting the scope of the present invention.

Example 1

Figure 5:
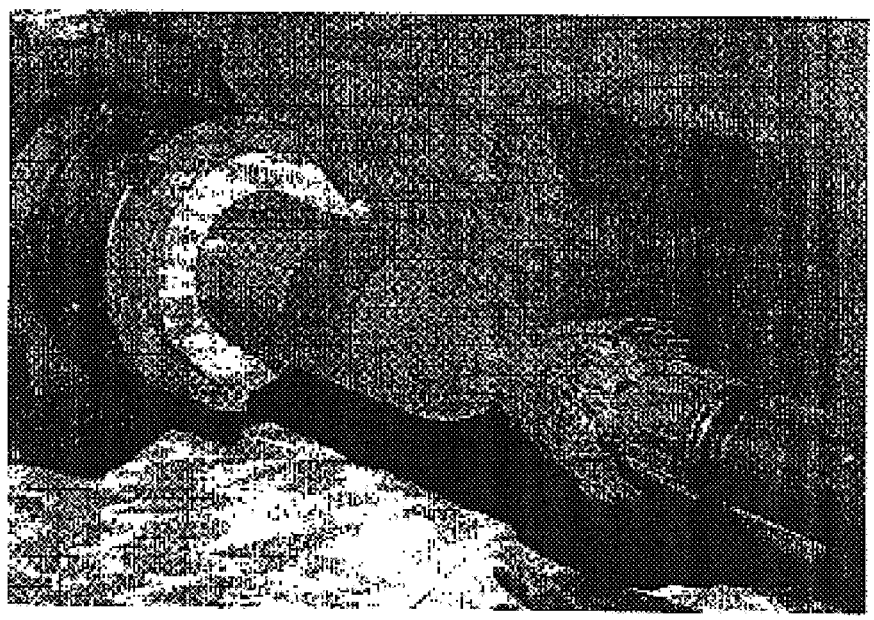
FIG. 5 is a photograph showing preparation of a structure using green fibrous monolith filaments in accordance with the present invention.

A HfC/W—Re composite for a solar thermal propulsion engine application was fabricated using FM technology. As mentioned above, monolithic HfC has a good oxidation resistance at elevated temperature and exhibits a high melting temperature. However, the use of HfC is limited by its poor thermal shock resistance. With an addition of ductile metal with high melting temperature, W—Re, the thermal shock resistance of this composite was improved dramatically. Table 2 provides coextrudable formulations of HfC/thermoplastic and W—Re/thermoplastic for the fabrication of HfC/WRe FM composite components. FIG. 5 shows a 'green' nozzle assembly in which HfC/W—Re fibers are in the process of being wound onto a graphite mandrel prior to hot pressing.

TABLE 2

| Material | Density (g/cc) | Volume % | Mass (g) |
|---|---|---|---|
| HfC | 12.67 | 54.00 | 287.36 |
| EEA[1] | 0.93 | 18.00 | 7.11 |
| EVA[2] | 0.94 | 18.00 | 7.03 |
| Heavy Mineral Oil | 0.88 | 10.00 | 4.44 |

TABLE 3

| Material | Density (g/cc) | Volume % | Mass (g) |
|---|---|---|---|
| W-3.6%Re-0.26%HfC | 19.33 | 49.00 | 404.31 |
| EEA | 0.93 | 40.00 | 18.75 |
| MPEG 550 | 1.10 | 10.2 | 4.73 |

Example 2

Tantulum-based FM composites for high temperature propulsion applications were prepared. The FM composites included propulsion nozzles and thrusters, and hot gas valves for use in rocket engines. Tables 4 and 5 present co-extrudeable formulations for the production of TaC—HfC/BN fibrous monolith composite filament.

TABLE 4

| Material | Density (g/cc) | Volume % | Mass (g) |
|---|---|---|---|
| TaC20%HfC | 13.63 | 54.00 | 309.13 |
| EEA | 0.93 | 18.00 | 7.11 |
| EVA | 0.94 | 18.00 | 7.03 |
| Heavy Mineral Oil | 0.88 | 10.00 | 4.44 |

TABLE 5

| Material | Density (g/cc) | Volume % | Mass (g) |
|---|---|---|---|
| BN | 2.29 | 54.00 | 51.94 |
| EEA | 0.93 | 46.00 | 17.97 |
| MPEG 550 | 1.10 | minimal | Minimal |

[1] Ethylene Ethyl Acrylate, Union Carbide
[2] Ethylene Vinyl Acetate, DuPont

Example 3

Various HfC-based FM composite systems were prepared. Mechanical properties of the HfC-based composites are presented in Table 6.

TABLE 6

| FM System | Architecture | Theoretical EMOD (GPa) | Measured EMOD (GPa) | Fracture Stress (MPa) |
|---|---|---|---|---|
| HfC/BN/HFC | Honeycomb (82.5/17.5)/17.5 | 313.02 | 336.0 ± 10.6 | 183.3 ± 16.3 |
| HfC/G/HfC | Honeycomb (82.5/17.5)/17.5 | 302.48 | 324.8 ± 10.9 | 220.5 ± 18.9 |
| HfC/W3.6Re | Bi-layer 82.5/17.5 | 459.2 | 453.1 ± 7.8 | 325.2 ± 80.8 |
| HfC/W3.6Re | Bi-layer 90/10 | 463.4 | 461.2 ± 17.1 | 362.5 ± 74.9 |

TABLE 6-continued

| FM System | Architecture | Theoretical EMOD (GPa) | Measured EMOD (GPa) | Fracture Stress (MPa) |
|---|---|---|---|---|
| HfC/W3.6Re | Bi-layer 50/50 | 382.5 | 293 ± 11.2 | 197.1 ± 10.8 |

The HfC FM composite systems were heated to temperatures of 2000° C. (3632° F.) with 34.5 MPa (5 ksi) of pressure for soak times of 1 hour in order to densify the FM composites. Under these conditions, HfC combined with the cell boundary materials (hBN, graphite and W3.6Re) to roughly 90% of full theoretical density. Table 7 summarizes these results.

TABLE 7

| HfC System | Architecture | Theoretical Density (g/cc) | Measured Density (g/cc) | % Full Theoretical Density |
|---|---|---|---|---|
| HfC/BN/HFC | Honeycomb (82.5/17.5)/17.5 | 11.17 | 10.69 | 95.70 |
| HfC/G/HfC | Honeycomb (82.5/17.5)/17.5 | 11.1 | 10.4 | 93.69 |
| HfC/W3.6Re | Bi-layer 82.5/17.5 | 13.84 | 13.12 | 93.58 |
| HfC/W3.6Re | Bi-layer 90/10 | 13.336 | 12.62 | 92.70 |
| HfC/W3.6Re | Bi-layer 50/50 | 16.00 | 13.76 | 86 |

G = graphite.

To increase the composite density, the consolidation temperature was raised to 2200° C., while maintaining the previous pressure and soak time. The results for the HfC/BN/HfC test coupons are presented in Table 8.

TABLE 8

| HfC System | Architecture | Theoretical Density (g/cc) | Measured Density (g/cc) | % Full Theoretical Density |
|---|---|---|---|---|
| HfC/BN/HFC | Honeycomb (82.5/17.5)/17.5 | 11.261 | 11.259 | 99.98 |
| HfC/BN/HFC | Honeycomb (82.5/17.5)/17.5 | 11.261 | 11.264 | 100 |
| HfC/BN/HFC | Honeycomb (82.5/17.5)/25 | 11.382 | 11.056 | 97.14 |

Example 4

Various TaC-based FM composites were prepared and sintered using a uni-axial hot press. A 1"×3"×0.25" thick billet of TaC/W3.6Re was consolidated to 99% theoretical density at 1900° C. (3452° F.) under 27.6 MPa (4 ksi) of pressure. The maximum temperature used to consolidate any TaC-based FM composite was 1950° C. (3542° F.) and 34.4 MPa (5 ksi) pressure.

TaC contains 20 wt % HfC. Because TaC—HfC solid solutions (e.g. 80% TaC-20% HfC) have high melting temperatures and even better oxidation resistance than Ta carbides or Hf carbides alone, HfC was added to the TaC. The success in densifying the TaC-based systems may be a result of the HfC additions that may be acting as a sintering aid.

Mechanical properties of the TaC-based composites are presented in Table 9. The results of these densification experiments are summarized in Table 10.

TABLE 9

| FM System | Architecture | Theoretical EMOD (GPa) | Measured EMOD (GPa) | Fracture Stress (MPa) |
| --- | --- | --- | --- | --- |
| TaC(HfC)/BN/TaC(HfC) | Honeycomb (82.5/17.5)/17.5 | 318.15 | 370.6 ± 16.9 | 291.3 ± 16.6 |
| TaC(HfC)/G/TaC(HfC) | Honeycomb (82.5/17.5)/17.5 | 307.61 | 340.6 ± 14.5 | 257.5 ± 61.7 |
| TaC(SiC)/BN/TaC(SiC) | Honeycomb (82.5/17.5)/17.5 | 318 | 378.1 ± 4.0 | 400.7 ± 28.9 |
| TaC/G/TaC | 3-layer (50/25/25) | 270.75 | 311.3 | 180.8 ± 24.2 |
| TaC/W3.6Re | Bi-layer 82.5/17.5 | 367.6 | 475 ± 6.9 | 302.7 ± 45.9 |
| TaC/W3.6Re | Bi-layer 90/10 | 363.5 | 497.7 ± 27.1 | 440.6 ± 38.4 |

TABLE 10

| FM System | Architecture | Theoretical Density (g/cc) | Measured Density (g/cc) | % Full Theoretical Density |
| --- | --- | --- | --- | --- |
| TaC(HfC)/BN/TaC(HfC) | Honeycomb (82.5/17.5)/17.5 | 12.02 | 11.749 ± 0.128 | 97.75 |
| TaC(HfC)/G/TaC(HfC) | Honeycomb (82.5/17.5)/17.5 | 11.96 | 11.67 ± 0.146 | 97.57 |
| TaC(SiC)/BN/TaC(SiC) | Honeycomb (82.5/17.5)/17.5 | 11.927 | 11.035 ± 0.049 | 92.52 |
| TaC/G/TaC | 3-layer (50/25/25) | 10.7 | 10.267 ± 0.107 | 95.95 |
| TaC/W3.6Re | Bi-layer 82.5/17.5 | 14.57 | 14.426 ± 0.011 | 99 |
| TaC/W3.6Re | Bi-layer 90/10 | 14.14 | 13.776 ± 0.737 | 97.43 |

G = graphite

Three test coupons were prepared using TaC without any sintering aids to evaluate if a TaC/BN/TaC FM composite system can be densified without sintering aids. The consolidation temperature also was increased to 2200° C., with pressures and soak times remaining constant. The results for these coupons are presented in Table 11.

TABLE 11

| FM System | Architecture | Theoretical Density (g/cc) | Measured Density (g/cc) | % Full Theoretical Density |
| --- | --- | --- | --- | --- |
| TaC/BN/TaC | Honeycomb (82.5/17.5)/17.5 | 12.218 | 11.910 | 97.48 |
| TaC/BN/TaC | Honeycomb (82.5/17.5)/25 | 12.371 | 12.192 | 98.55 |
| TaC/BN/TaC | Honeycomb (82.5/17.5)/31 | 12.493 | 12.250 | 98.05 |

Example 5

Various ZrC-based FM composites were prepared and sintered at 1900° C. to 1950° C. at 27.6 MPa to 30.3 MPa (4 to 4.4 ksi). Mechanical properties of the TaC-based composites are presented in Table 12. The results of these densification experiments are summarized in Table 13.

TABLE 12

| FM System | Architecture | Theoretical Density (g/cc) | Measured Density (g/cc) | % Full Theoretical Density |
| --- | --- | --- | --- | --- |
| ZrC/BN/ZrC | Honeycomb (82.5/17.5)/17.5 | 5.886 | 5.123 ± 0.062 | 87.03 |
| ZrC/G/ZrC | Honeycomb (82.5/17.5)/17.5 | 5.69 | 5.333 ± 0.01 | 93.73 |
| ZrC/BN/ZrC | 3-layer (80/10/10) | 5.94 | 5.348 ± 0.104 | 90.03 |
| ZrC/G/ZrC | 3-layer (80/10/10) | 5.895 | 5.671 ± 0.031 | 96.2 |
| ZrC/G/ZrC | 3-layer (50/25/25) | 5.213 | 5.18 ± 0.03 | 99.37 |
| ZrC/W3.6Re | Bi-layer 82.5/17.5 | 8.622 | 8.183 ± 0.086 | 94.91 |
| ZrC/W3.6Re | Bi-layer 90/10 | 7.648 | 7.343 ± 0.082 | 96.01 |

G = graphite

TABLE 13

| FM System | Architecture | Theoretcal EMOD (GPa) | Measured EMOD (GPa) | Fracture Stress (MPa) |
|---|---|---|---|---|
| ZrC/BN/ZrC | Honeycomb (82.5/17.5)/17.5 | 356.66 | 259.9 ± 9 | 213.00 ± 32.98 |
| ZrC/G/ZrC | Honeycomb (82.5/17.5)/17.5 | 346.12 | 329 ± 4.9 | 249.83 ± 28.69 |
| ZrC/BN/ZrC | 3-layer (80/10/10) | 370.9 | 236.9 ± 19.6 | 297.5 ± 29.3 |
| ZrC/G/ZrC | 3-layer (80/10/10) | 363.6 | 294.5 ± 8.6 | 288.5 ± 54.3 |
| ZrC/G/ZrC | 3-layer (50/25/25) | 304.5 | 267.4 ± 8.3 | 248.9 ± 13.7 |
| ZrC/W3.6Re | Bi-layer 82.5/17.5 | 404.75 | 420.10.6 | 118.2 ± 28.4 |
| ZrC/W3.6Re | Bi-layer 90/10 | 404 | 442.7 ± 5.1 | 243.38.3 |

Although the consolidation parameters were fairly consistent, the resulting degree of consolidation varied between FM composite systems depending on the cell boundary material. Surprisingly, the ZrC FMs containing BN as an interface material did not consolidate as well as those containing graphite. FM composites with a graphite interface have in the past proven more difficult to densify as a result of graphite being very difficult to sinter. To improve densification, SiC at varying ratios may be used as a sintering aid for ZrC.

To increase the composite density, the consolidation temperature was raised to 2200° C. The results for the ZrC/BN/ZrC test coupons are presented in Table 14.

TABLE 14

| FM System | Architecture | Theoretical Density (g/cc) | Measured Density (g/cc) | % Full Theoretical Density |
|---|---|---|---|---|
| ZrC/BN/ZrC | Honeycomb (82.5/17.5)/25 | 6.176 | 6.154 | 99.64 |
| ZrC/BN/ZrC | Honeycomb (82.5/17.5)/17.5 | 6.124 | 6.183 | 100 |
| ZrC/BN/ZrC | Honeycomb (82.5/17.5)/17.5 | 6.124 | 6.015 | 98.22 |
| ZrC/BN/ZrC | Honeycomb (82.5/17.5)/17.5 | 6.124 | 5.785 | 94.47 |

Example 6

This example illustrates how fibrous monolith architecture protects materials from thermal shock at high temperatures. Various $ZrB_2$-based fibrous monolithic ceramics were prepared. $ZrB_2$ has a high melting point of about 3000° C. and exhibits excellent oxidation resistance, creep resistance at elevated temperatures, and moderate thermal stress resistance for a monolithic ceramic. To improve the thermal stress resistance of $ZrB_2$, the material was prepared as a fibrous monolith with $ZrB_2$ as the cell (primary) material of the fibrous monolith composite structure. The cell boundary (secondary) phase in the fibrous monolith structure consisted of boron nitride (BN), a low shear strength material with a melting point of 3000° C. The low shear strength BN accommodates for expansions and contractions during thermal cycling of the component, resulting in improved thermal shock resistance. Furthermore, a zirconia or hafnia scale that grew from the carbide cell phase at high temperatures protected the BN from oxidation. The BN or graphite cell boundaries enables non-catastrophic failure due to stress delocalization and crack deflection mechanisms.

Tubes of $ZrB_2$/BN and $HfB_2$/BN for use in solar thermal propulsion applications were prepared and exposed to temperatures up to 3000° C. Several of these tubes were tested in an Arc-Lamp test facility under flowing nitrogen gas at a temperature of 2500° C. The tubes underwent severe thermal shock for several cycles at a maximum rate of 1000° C./second with no visible sign of degradation to their structure after testing. The BN interlayer surrounding the $ZrB_2$ cells rendered the material insensitive to thermal shock.

What is claimed is:

1. A high temperature fibrous monolith composite comprising:
    a primary phase selected from the group consisting of metal, metal alloy, carbide, nitride, boride, oxide, phosphate and silicide and combinations thereof; and
    an interface phase selected from the group consisting of metal, metal alloy, carbide, nitride, boride, oxide, phosphate and silicide and combinations thereof and generally surrounding the primary phase,
    the phases being generally discrete in the composite and each phase being selected from the group consisting of materials that remain in the solid state to allow use of the composite at an operating temperature of at least about 1000° C. or more.

2. The high temperature fibrous monolith composite of claim 1, wherein each phase is selected from the group consisting of materials that remain in the solid state to allow use of the composite at an operating temperature of at least about 1600° C. or more.

3. The high temperature fibrous monolith composite of claim 1, wherein each phase is selected from the group consisting of materials that remain in the solid state to allow use of the composite at an operating temperature of at least about 2500° C. or more.

4. The high temperature fibrous monolith composite of claim 1, wherein each phase is selected from the group consisting of materials that remain in the solid state to allow use of the composite at an operating temperature of at least about 3000° C. or more.

5. An article of manufacture suitable for use in a high temperature environment comprising fibrous monolith composite materials, fibrous monolith composite materials comprising:
    a first composition selected from the group consisting of metal, metal alloy, carbide, nitride, boride, oxide, phosphate and suicide and combinations thereof; and
    a second composition generally surrounding the first composition and selected from the group consisting of metal, metal alloy, carbide, nitride, boride, oxide, phosphate and silicide and combinations thereof,
    the compositions being generally discrete in the composite materials and each composition being selected from the group consisting of materials that remain in the solid state to allow use of the article at an operating temperature of at least about 1000° C. or more.

6. The article of manufacture of claim 5, wherein the article is an anti-matter containment vessel.

7. The article of manufacture of claim 5, wherein the article is a furnace furniture radiant burner panel.

8. The article of manufacture of claim 5, wherein the article is a rocket nozzle.

9. The article of manufacture of claim 5, wherein the article is an internal combustion engine component.

10. The article of manufacture of claim 5, wherein the article is a steering vane for vectored thrust control.

11. The article of manufacture of claim 5, wherein the article is a cutting tool.

12. The article of manufacture of claim 5, wherein the article is a radiant burner tube.

13. The article of manufacture of claim 5, wherein the article is an x-ray target for CT Scanner X-ray tubes.

14. The article of manufacture of claim 5, wherein the article is high temperature furnace equipment.

15. The article of manufacture of claim 5, wherein the article is a solid hot gas containment tube.

16. The article of claim 5, wherein each composition is selected from the group consisting of materials that remain in the solid state to allow use of the article at an operating temperature of at least about 1600° C. or more.

17. The article of claim 5, wherein each composition is selected from the group consisting of materials that remain in the solid state to allow use of the article at an operating temperature of at least about 2500° C. or more.

18. The article of claim 5, wherein each composition is selected from the group consisting of materials that remain in the solid state to allow use of the article at an operating temperature of at least about 3000° C. or more.

19. A method of producing an X-ray target comprising the step of:
   extruding a fibrous monolith material through a deposition nozzle; and depositing the fibrous monolith material onto a substrate.

20. A method of manufacturing a high temperature fibrous monolith composite comprising:
   blending a first composition of one or more powders selected from the group consisting of metal, metal alloy, carbide, nitride, boride oxide, phosphate and silicide and combinations thereof with a processing compound to provide a core material;
   blending a second composition of one or more powders selected from the group consisting of metal, metal alloy, carbide, nitride, boride, oxide, phosphate and silicide and combinations thereof with a processing compound to provide a shell material;
   forming a feed rod from the core material and shell material, the core material and shell material having a volume ratio in the range of about 50:50 to about 99:1;
   extruding the formed feed rod to create a reduced diameter filament; and
   sintering the filament to provide the high temperature fibrous monolith composite,
the core material and shell material being generally discrete in the composite and each composition being selected from the group consisting of materials that remain in the solid state to allow use of the composite at an operating temperature of at least about 1000° C. or more.

21. The method of in claim 20, wherein the processing compound includes a polymer binder and wherein the polymer binder is removed from the filament after extrusion.

22. A method of manufacturing a high temperature fibrous monolith composite comprising:
   blending a first composition of one or more powders selected from the group consisting of metal, metal alloy, carbide, nitride, boride, oxide, phosphate and suicide and combinations thereof with a processing compound to provide a core material;
   blending a second composition of one or more powders selected from the group consisting of metal, metal alloy, carbide, nitride, boride, oxide, phosphate and suicide and combinations thereof with a processing compound to provide a shell material;
   forming a feed rod from the core material and shell material, the core material and shell material having a volume ratio in the range of about 50:50 to about 99:1;
   extruding the formed feed rod to create a reduced diameter first filament;
   consolidating two or more first filaments to create a multi-filament rod;
   extruding the multi-filament rod to create a reduced diameter second filament; and
   sintering the filament to provide the high temperature fibrous monolith composite,
the core material and shell material being generally discrete in the composite and each composition being selected from the group consisting of materials that remain in the solid state to allow use of the composite at an operating temperature of at least about 1000° C. or more.

23. An X-ray target comprising:
   a layer of fibrous monolith material; and
   a substrate.

24. The X-ray target of claim 23 wherein the fibrous monolith material is selected from the group consisting of metal, metal alloy, carbide, nitride, boride, oxide, phosphate and silicide.

25. An X-ray target comprising:
   a substrate having a first and second side;
   a first layer of fibrous monolith material deposited on the first side of the graphite substrate; and
   a second layer of fibrous monolith material deposited on the second side of the graphite substrate.

26. The X-ray target of claim 25 wherein the fibrous monolith material is selected from the group consisting of metal, metal alloy, carbide, nitride, boride, oxide, phosphate and silicide.

* * * * *

UNITED STATES PATENT AND TRADEMARK OFFICE
CERTIFICATE OF CORRECTION

PATENT NO. : 6,847,699 B2  Page 1 of 1
DATED : January 25, 2005
INVENTOR(S) : Mark J. Rigali et al.

It is certified that error appears in the above-identified patent and that said Letters Patent is hereby corrected as shown below:

Column 1,
Lines 36, 43 and 45, please "suicides" with -- silicides --.

Column 18,
Line 50, please replace "suicides" with -- silicides --.

Column 20,
Lines 10 and 16, please replace "suicides" with -- silicides --.

Signed and Sealed this

Nineteenth Day of April, 2005

JON W. DUDAS
*Director of the United States Patent and Trademark Office*